United States Patent

Best

[15] 3,701,211
[45] Oct. 31, 1972

[54] MEANS FOR CONTROLLING PALLET TRUCK FOOT PEDAL POSITION

[72] Inventor: Eric Best, Welland, Ontario, Canada
[73] Assignee: Hyster Company, Portland, Oreg.
[22] Filed: Nov. 4, 1969
[21] Appl. No.: 873,821

[52] U.S. Cl. ............... 280/43.12, 280/43.23, 74/480
[51] Int. Cl. ............................................. B62d 21/18
[58] Field of Search ..280/43.12, 43.23; 74/516, 518, 74/480, 523, 479; 254/2, 6; 180/9

[56] References Cited

UNITED STATES PATENTS

| | | | |
|---|---|---|---|
| 1,129,775 | 2/1915 | Anthony | 280/43.12 |
| 1,657,738 | 1/1928 | Booth | 74/480 |
| 2,189,010 | 2/1940 | Lewis | 254/2.2 |
| 2,359,493 | 10/1944 | Schreck | 280/43.12 |
| 2,441,212 | 5/1948 | Schenk | 74/518 |

Primary Examiner—Leo Friaglia
Assistant Examiner—Robert R. Song
Attorney—Francis Swanson

[57] ABSTRACT

In a hand operated hydraulic type pallet truck, means actuated by limited downward swinging movement of the truck handle from vertical position to cause a pivoted foot treadle originally in a position substantially parallel to the handle to swing downwardly through a greater arc to a position where the operator may readily place his foot thereon to actuate the hydraulic truck lifting means.

9 Claims, 7 Drawing Figures

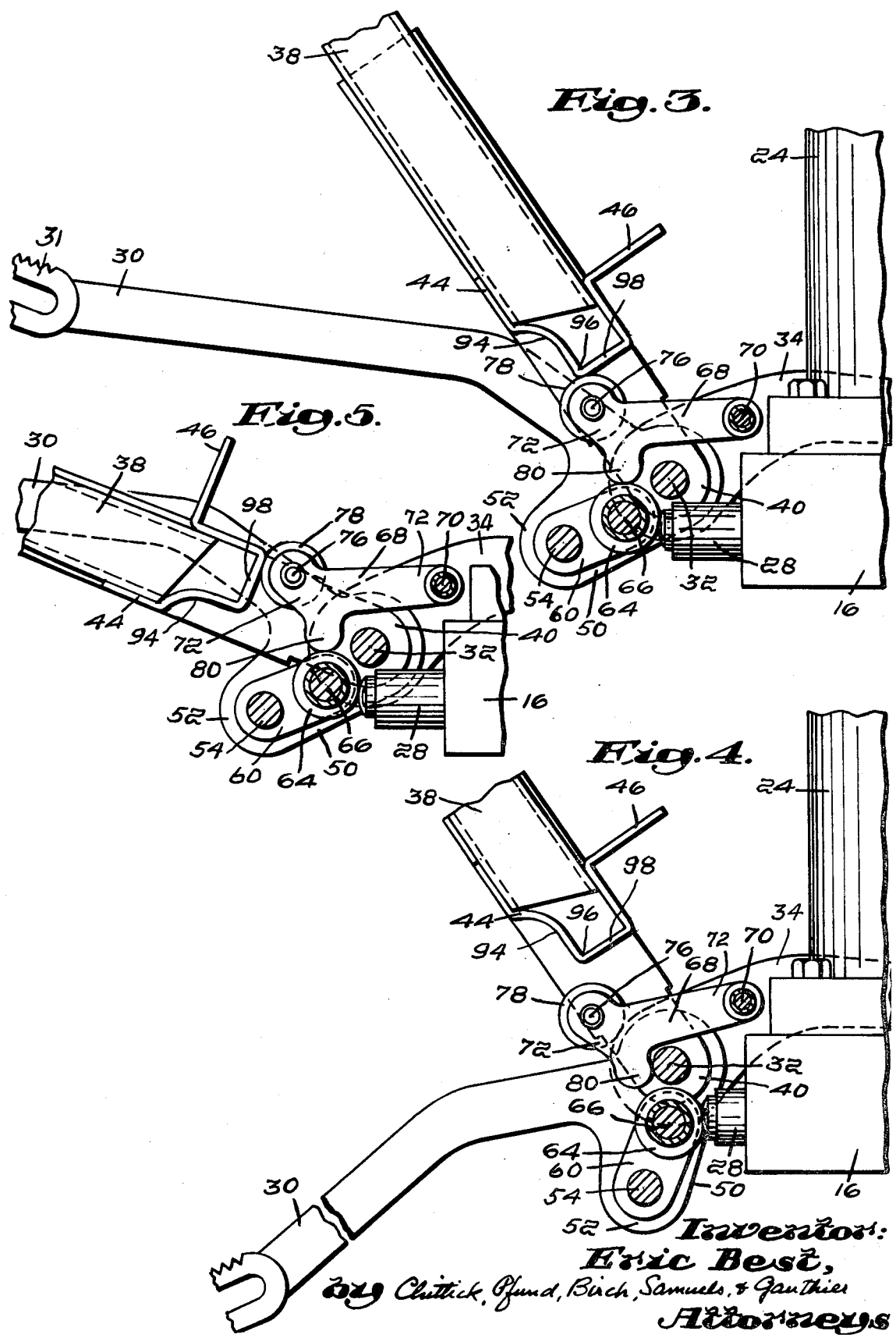

1

MEANS FOR CONTROLLING PALLET TRUCK FOOT PEDAL POSITION

BRIEF SUMMARY OF THE INVENTION

While the invention will be disclosed hereinafter with particular reference to a hand-operated hydraulic type pallet truck, it broadly contemplates a novel mechanical arrangement wherein a first lever mounted for swinging movement on a pivot will, when swung through a limited arc (in the present instance about 40° more or less), cause substantially greater angular movement of a second lever mounted on the same pivot. Thereafter as swinging movement of the first lever is continued, the movement of the second lever will stop or be substantially less than the movement of the first lever so that the first lever will catch up with the second lever to bring both levers into side by side position.

The invention has particular application to a hand-operated hydraulic type pallet truck. In this type of truck there is a treadle which when moved up and down by the operator's foot, pumps hydraulic fluid into a cylinder to raise the truck frame to a higher level. Usually when the truck is at rest at a pallet location, the pulling and steering handle will be in substantially vertical position held there by suitable springs. The foot treadle preferably is mounted for swinging action on the same pivot as the handle and will likewise be held by springs in vertical position in substantial alignment with the handle. Heretofore, when the operator wished to use the foot treadle, it was necessary for him to lift his foot to an uncomfortable height and place it on the foot treadle in order to push the treadle down to a horizontal position before commencing operation of the hydraulic pump.

In the present invention, the arrangement is such that when the operator wishes to operate the foot treadle he merely swings the handle downwardly through approximately 40° and in so doing cam and lever mechanisms of novel construction are arranged to cause movement of the foot treadle through an arc of about 80°, thus placing the foot treadle automatically in a suitable position to be easily engaged by the operator's foot. The operating arc of the foot treadle is approximately from somewhat above horizontal downwardly through perhaps another 30° to 45°. After the operator has his foot on the treadle ready to perform the pumping operation the handle may be maintained in a downward position or returned to vertical.

Since the separation of the treadle from the handle occurs automatically whenever the handle is swung downwardly, whether or not the foot treadle is to be used on that occasion, it is desirable that the treadle return to its position alongside the handle when the truck is being pushed or pulled with the handle in its lower operating position. Accordingly, when the handle is swung downwardly beyond the position at which the treadle has advanced to foot receiving position, there is little or no further downward movement of the treadle and no related pumping action by the treadle caused by the further downward movement of the handle. The treadle stays in its more or less horizontal position until the further downward movement of the handle brings the handle into alignment with the treadle after which any additional downward movement of the handle will carry the treadle with it.

When the handle is returned from down to vertical position, the same relative movement of the treadle with respect to the handle occurs in reverse.

BRIEF DESCRIPTION OF THE DRAWINGS

FIG. 3 is a view similar to FIG. 2 in which the handle has been swung downwardly through a small arc and the foot treadle has moved through a much greater arc.

FIG. 4 shows the handle in the same position as FIG. 3 but with the foot treadle forced downwardly by the operator to actuate the hydraulic pump.

FIG. 5 shows the realignment of the foot treadle with the handle as the handle is swung downwardly from the position of FIG. 3.

FIG. 6 is an enlarged elevation of the operating mechanisms looking to the right from the left of FIGS. 1 and 2.

FIG. 7 shows means for manually actuating a lowering valve through mechanism shown only in FIG. 6.

DESCRIPTION OF THE PREFERRED EMBODIMENT

Figure 1:
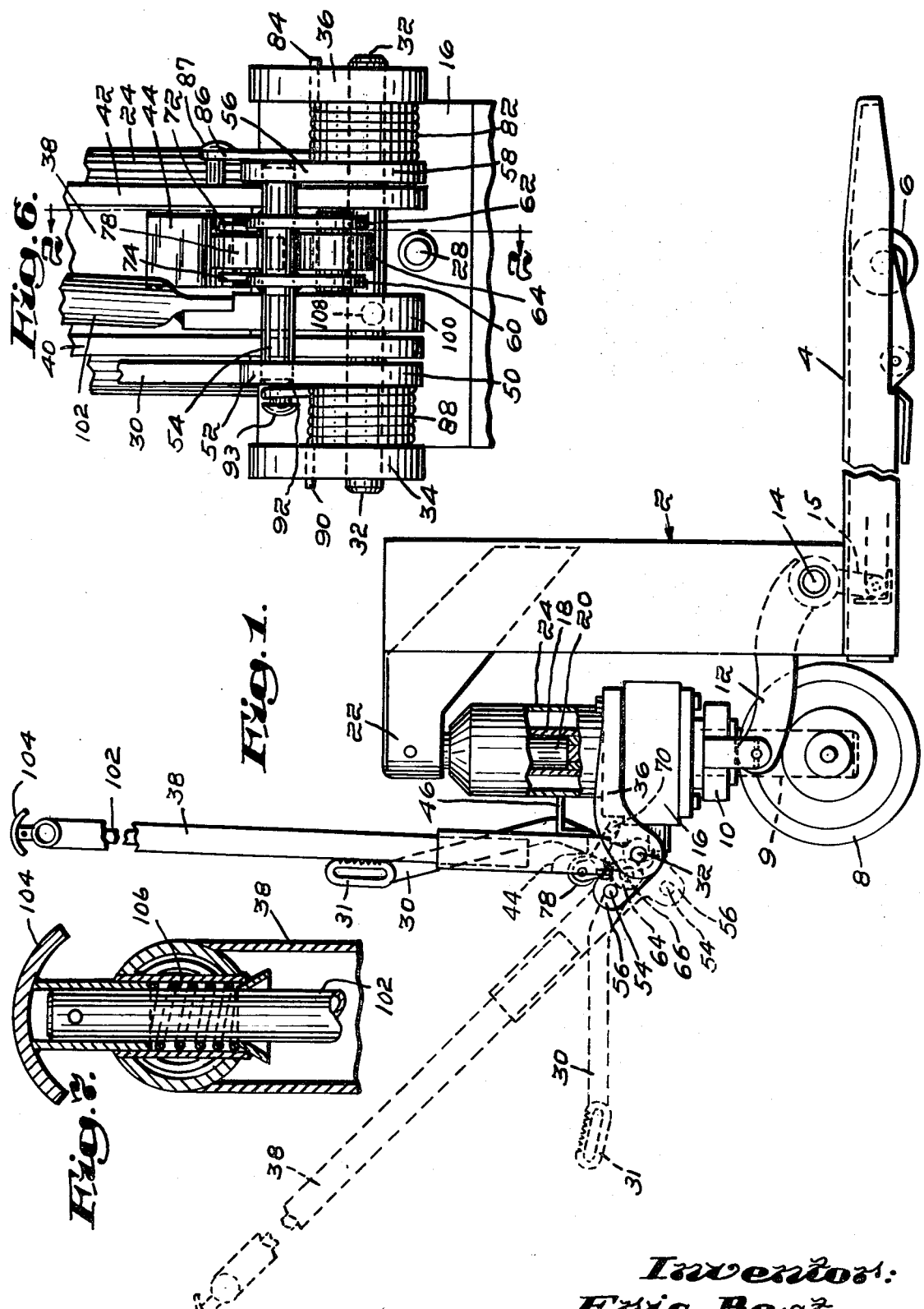
FIG. 1 is a side elevation of a hand operated hydraulic type pallet truck with the handle and foot treadle in generally vertical position. The dotted line position of the handle and foot treadle shows the separation that occurs during partial downward movement of the handle.

Referring first to FIG. 1, there is shown a general assembly comprising a truck 2 having rearwardly extending spaced forks 4, rear wheels 6 (one under each fork), and a dual front steering wheel 8.

Suitably mounted above the front wheel 8 and carried by the steering post 9 is a cross-wise extending platform 10 connected at its ends to levers 12 which at their rear ends are pivotally mounted on opposite sides of the truck frame at 14. Levers 12 have integral therewith short downwardly extending levers 15 which are connected to linkages extending along the under sides of forks 4 for moving wheels 6 downward with respect to the forks 4 when levers 12 are turned counterclockwise about pivots 14. Above platform 10 and fixed to post 9 is a base 16 carrying a cylinder 18 and piston 20. The upper end of the piston 20 is affixed to a forwardly extending part 22 of the frame 2. Cylinder 18 is surrounded by an outer preferably cylindrical reservoir 24 in which is stored hydraulic fluid.

Figure 2:
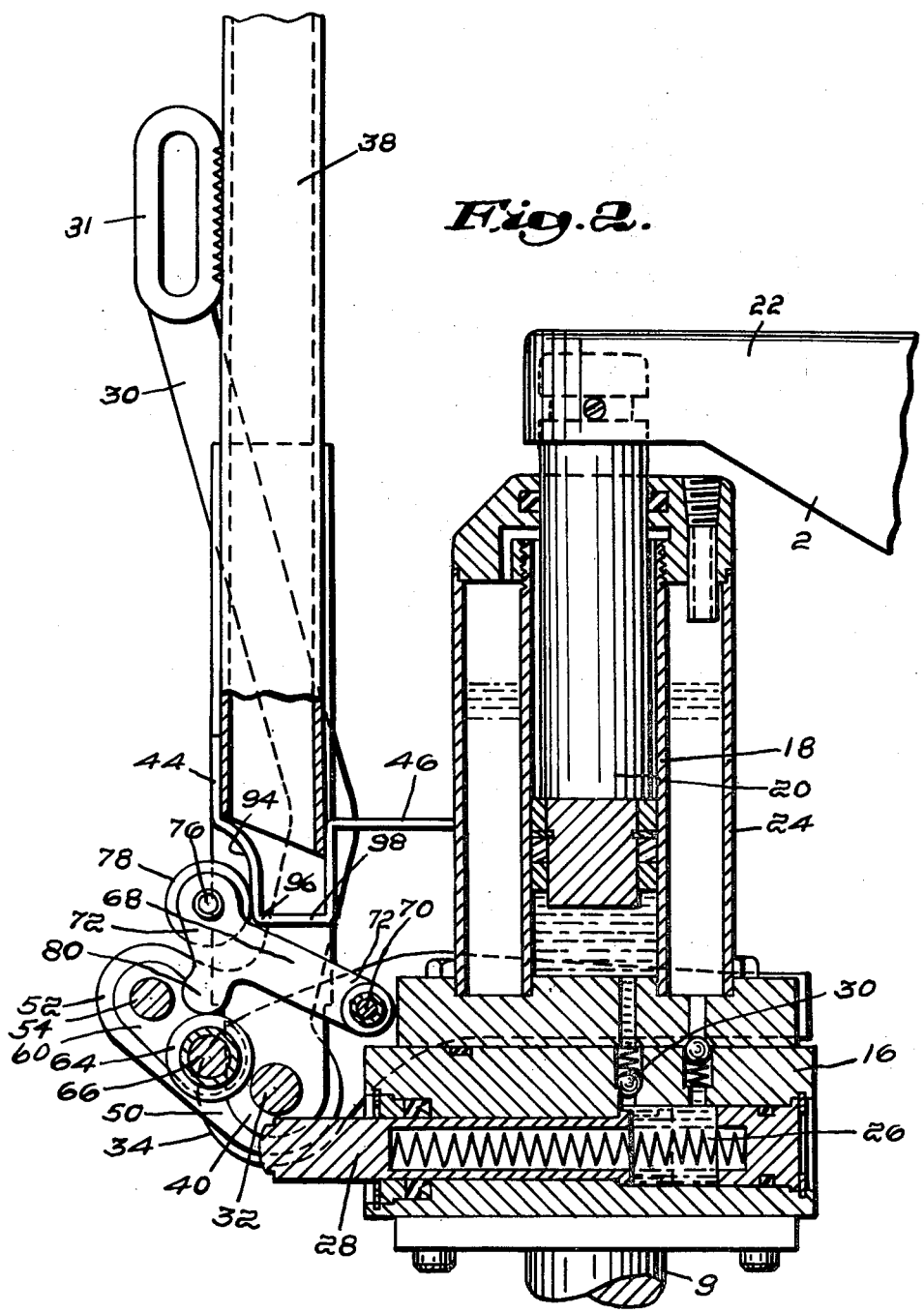
FIG. 2 is an enlarged view of the various elements that cause the accelerated downward movement of the treadle with respect to the handle.

As can be seen in FIG. 2, the base 16 includes hydraulic pump mechanism generally referred to at 26. This pump comprises a piston 28 which when moved to the right forces hydraulic fluid upwardly past spring-pressed valve 30 into the lower end of cylinder 18, thus to move piston 20 upward. As piston 20 is moved upward by actuation of pump 26, the front end of frame 2 is raised. Simultaneously, upward movement of the pivots 14 causes counter-clockwise rotation of levers 12 and 15 moving the linkages which force the forks 4 upwardly with respect to wheels 6.

All of the structure just described for raising the frame 2 is old and constitutes no part of the present invention.

The pump piston 28 is actuated by up and down movement of treadle 30 which has a foot engaging part 31. The treadle is mounted on a pivot shaft 32 whose ends are fixed in spaced brackets 34 and 36 attached to the sides of base 16.

Also mounted on pivot shaft 32 is a handle 38 which is used when swung downwardly through a suitable angle to push or pull and steer the truck. The handle 38 includes at its lower end a pair of spaced side plates 40 and 42 which are pivoted on shaft 32. Mounted near the lower end of handle 38 is a cam 44 having a transverse configuration which can be plainly seen in FIGS. 2, 3, 4 and 5. At the rear of handle 38 is a stop 46 which engages cylinder 24 to limit rearward movement of handle 38 when in vertical position.

The lower end 50 of treadle 30 has an extension 52 to which is rigidly affixed a transverse bar 54. On the other end of this bar, as can best be seen in FIG. 6, is an arm 56 pivoted at 58 on shaft 32. Also fixedly mounted on bar 54 are a pair of arms 60 and 62 between which at their lower ends is a shaft 66 carrying roller 64. From the foregoing, it will be understood that the extension 52, bar 54, arm 56 and arms 60 and 62 constitute a rigid assembly such that whenever treadle 30 is rotated on shaft 32, all of the aforementioned parts will move correspondingly as a unit in circular paths.

An intermediate lever 68 is pivotally mounted on a shaft 70 the ends of which are supported by brackets 34 and 36. Lever 68 has forked ends 72 and 74 between which extends a shaft 76 carrying a roller 78. This roller, as can be seen in FIG. 6, is in alignment with and engages cam 44.

On the bottom forward end of lever 68 and integral therewith, is a generally semi-circular boss 80 positioned to make engagement with roller 64. It should be noted that the distances from shaft 70 to shaft 76, to boss 80 and to shaft 66 are generally of the same magnitude so that whatever circular movement is given to shaft 76 and roller 78 will be translated to shaft 66 and its roller 64. It should also be observed that the distance from shaft 32 to cam 44 is more than twice the distance from shaft 32 to shaft 66.

Between treadle arm 56 and bracket 36 is a torsion spring 82 having one end 84 positioned in a hole in bracket 36. The other end 86 is fastened by pin 87 to sideplate 42 of handle 38. Another spring 88 has one end 90 secured in bracket 34 and the other end 92 secured to a pin 93 attached to treadle 30. These two springs, 82 and 88, serve the purpose of holding both handle 38 and foot treadle 30 in normal inoperative vertical position as shown in FIGS. 1 and 2.

With the various operating parts having been described, the behavior of the several elements under downward swinging movement of handle 38 will now be explained.

When handle 38 is swung from vertical as in FIG. 2 through an angle of say 40° to the position of FIG. 3, the cam 44 causes substantially the same angular movement of lever 68 about shaft 70. The roller 78 has traveled along the front surface 94 of cam 44 to a position just beyond corner 96. Boss 80 of lever 68 acting on roller 64 causes roller 64 to move substantially the same circular distance as shaft 76 but because the radius distance of roller 64 from shaft 32 is about one half that of roller 78 from shaft 70 and about one half the radius distance of cam 44 from shaft 32, the extension 52 and treadle 30 will have been rotated about shaft 32 through a much greater angle thus to put the treadle 30 in the advanced position shown in FIG. 3.

With the treadle in this position the operator may then readily place his foot on treadle pad 31. The roller 64 has also reached a position near or against pump piston 28 so that further up and down movement of treadle 30 as suggested in FIGS. 3 and 4 will cause upward movement of piston 20.

After the operator has placed his foot on treadle 30 when in the position of FIG. 3, handle 38 may be maintained more or less in the position of FIG. 3 or returned to vertical as in FIG. 2. As treadle 30 is moved downward as in FIG. 4, lever 68 follows by gravity unit it is stopped by engagement with shaft 32.

When the piston 20 has raised frame 2 to the desired height by repeated up and down movements of treadle 30, the operator will remove his foot from pad 31 and the treadle will then return to a position with respect to handle 38 as permitted by boss 80, roller 78 and cam 44.

Restating the operation described above, as handle 38 is pulled downward from the vertical position of FIG. 2, the treadle 30 will move down at a greater angular rate causing progressive separation of treadle 30 from handle 38. The maximum separation occurs just as roller 78 passes the corner 96 of cam 44 and in this position the treadle is so placed that the operator without having touched the treadle, may easily place his foot on pad 31 to begin the pumping operation.

After the frame 2 has been raised sufficiently by the upward movement of piston 20 to lift the pallet (not shown) overlying forks 4 from the floor, the truck is ready to be moved by the operator to its new destination. The ordinary angle of handle 38 for convenient pushing or pulling and steering of the truck is at a more horizontal position such as that shown in FIG. 5 which might be in the order of 70° from the vertical.

Obviously, with the handle generally in the position of FIG. 5, it would be undesirable to have the foot treadle 30 extending downwardly toward the floor at a greater angle than the handle or to have the handle operate the pump when the handle is swung downwardly to its normal pushing or pulling position. This condition is avoided by using the novel shape of cam 44 which causes no further angular movement of lever 68 when the handle 38 moves from the position of FIG. 3 to that of FIG. 5. This is due to the substantially flat bottom surface 98 of cam 44 which moves past roller 78 without applying any downward rotative force to lever 68 as handle 38 advances. Thus no additional downward movement is imparted to treadle 30 as handle 38 moves from the position of FIG. 3 to that of FIG. 5. This permits handle 38 to catch up with treadle 30 so that the handle and treadle are realigned as they were in FIG. 2. Any further downward movement of handle 38 beyond the position of FIG. 5 carries treadle 30 with it and lever 68 with roller 78 follows under the force of gravity. Such further downward movement of the handle would not occur in normal use.

Thus, during normal manipulation of the truck from one place to another the treadle 30 will be aligned with handle 38. When the truck reaches its destination, the operator may allow the handle to return to inoperative vertical position. In so moving from the position of FIG. to that of FIG. 2, the roller 78 will travel in the reverse course along cam 44 causing temporary separation of treadle 30 from handle 38 as in FIG. 3 which of course is not objectionable.

With the truck at its desired destination, the frame should be lowered and the pallet redeposited on the floor. This is accomplished by mechanism which is disclosed and claimed in a separate application of Eric Best and Kenneth Booth, Sr. and which is now referred to briefly. A wedge 100 (see FIG. 6) guided on shaft 32, is actuated by a rod 102 extending up through handle 38 to a manual control element 104 at the handle end. Pressure on element 104 sufficient to overcome spring 106 causes wedge 100 to move a fluid relief control 108 to open position allowing piston 20 to descend accompanied by corresponding descent of frame 2 and forks 4.

In summary, handle 38 may be used in normal manner for pushing or pulling and guiding the truck. Handle 38 and the related cam actuated parts additionally provide means for placing the pump actuating treadle in a convenient position to receive the operator's foot. With pumping completed, the treadle rejoins the handle while the truck is being moved with the handle in lower position.

It is my intention to cover all changes and modifications of the invention herein chosen for purposes of disclosure which do not depart from the spirit and scope of the invention.

I claim:

1. First and second levers each having and end portion mounted adjacent each other at the respective end portions in inoperative position for turning movement on a first shaft, means for transmitting angular movement of the first lever from said inoperative position to the second lever in which the angular movement of the second lever will be substantially greater than that of the first lever, said means comprising a cam on the said end portion of the first lever, a force receiving member on said end portion of said second lever which member is closer to said first shaft than said cam, and an intermediate arm for transmitting angular motion of said cam of said first lever to the force receiving member of said second lever, said arm pivoted on a second shaft and positioned between said cam of the first lever and the force receiving member of the second lever, said arm having means located for simultaneous engagement by said cam and said force receiving member, the distance from said second shaft to the position of engagement between said cam and said arm means being substantially greater than the distance from said first shaft to the position of engagement of said arm means with said force receiving member, whereby when said arm is moved by angular movement of said first lever, said second lever will be moved through a greater angle.

2. First and second levers mounted adjacent each other for turning movement on a first shaft, means urging both levers in the same direction,
   means for transmitting angular movement of the first lever to the second lever in which the angular movement of the second lever will be substantially greater than that of the first lever,
   said means comprising a cam on the first lever,
   a force receiving member on said second lever which member is closer to said first shaft than said cam,
   and an intermediate arm for transmitting motion from said cam to said second lever, said arm pivoted on a second shaft and positioned between said cam of the first lever and the force receiving member of the second lever, said arm having means for simultaneously engaging said cam and said force receiving member, the effective length of said arm and the position of said second shaft being such that an arc centered at said second shaft and drawn through said cam engaging means will pass through said force receiving member of said second lever,
   whereby when said arm is moved by angular movement of said first lever, said second lever will be moved through a greater angle.

3. In a hand operated hydraulic type pallet truck, a handle and foot treadle mounted for turning movement on a first shaft;
   means urging said handle and treadle toward vertical position;
   means on said foot treadle to engage said handle to limit the treadle movement in one direction to a position adjacent said handle,
   a cam on said handle,
   a force receiving member on said foot treadle closer to said shaft than said cam but in the same arcuate plane as said cam;
   an intermediate arm pivotally mounted on a second shaft parallel to said first shaft, said arm located between said cam of the handle and the force receiving member of said foot treadle;
   said intermediate arm having cam engaging means and other means for engaging said force receiving member of said foot treadle; the distance of said cam engaging means and said other means from said second shaft being substantially greater than the radius of said force receiving member from said first shaft,
   whereby when said handle is moved downward through a limited angle, the foot treadle will move through a greater angle.

4. The construction set forth in claim 2,
   said cam shaped to cause less angular movement of said second lever than that of said first lever after said first lever has been moved through a predetermined angle from vertical whereby, upon further movement of said first lever, said first lever may catch up with said second lever within a total angular movement of said first lever of not more than 90°.

5. The construction set forth in claim 3,
   said cam shaped to cause less angular movement of said treadle than that of said handle after said handle has been moved through a predetermined angle from vertical whereby, upon further movement of said handle, said handle may catch up with said treadle with a total angular movement of said handle of not more than 90°.

6. The construction set forth in claim 3,
   said truck comprising a front wheel and a steering post carrying a base in fixed relation thereto, said base having a hydraulic piston and cylinder mounted thereon, said first shaft affixed to said base to provide means whereby said handle can steer said truck.

7. The construction set forth in claim 6,
said base including a fluid pump and means exterior of said base for operating said pump by actuation by said treadle.

8. The construction set forth in claim 3,
said cam having a first face extending generally radially from said first shaft and adapted to make initial engagement with said intermediate arm to move said arm through a substantial angle,
said cam having a second face extending generally at right angles to said first face to minimize further movement of said intermediate arm while movement of said handle continues.

9. The construction set forth in claim 8,
and means for limiting the movement of said intermediate arm with respect to said second face.

* * * * *